April 9, 1929.   R. C. DAUBS ET AL   1,708,874
DOUGH CHUTE
Filed April 29, 1927
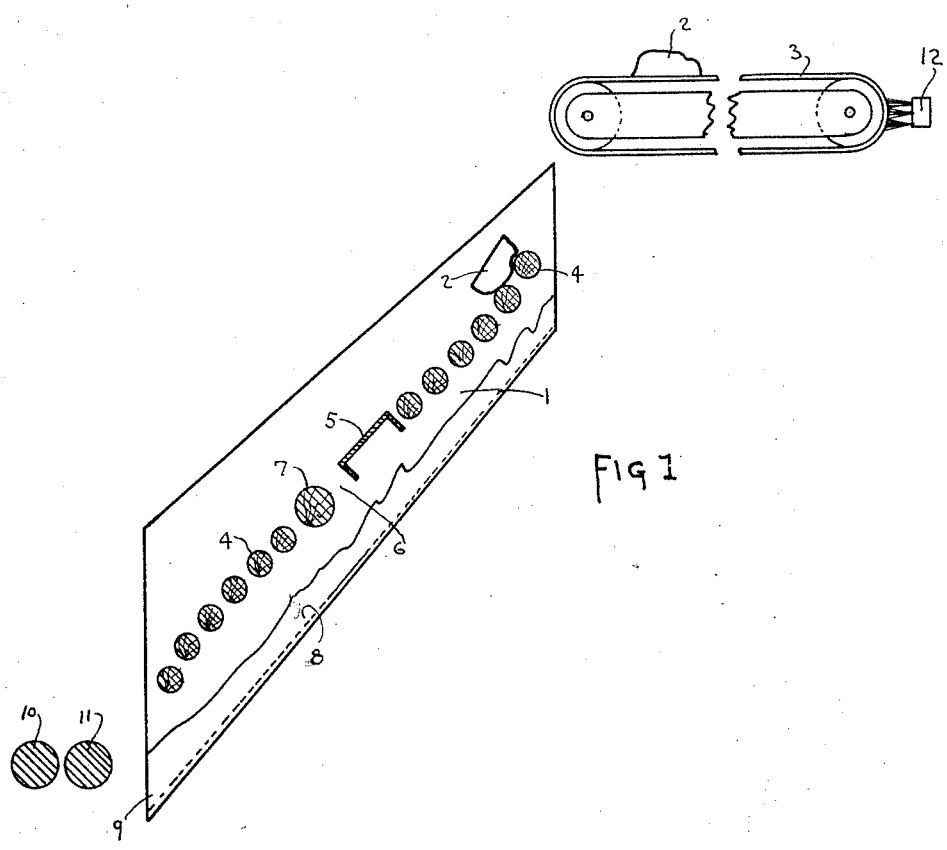
Fig 1
Fig 2
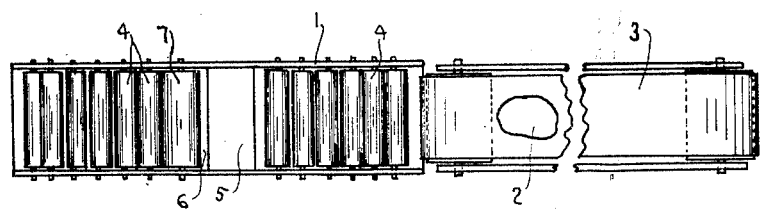
INVENTOR.
BY
ATTORNEY.

Patented Apr. 9, 1929.

1,708,874

UNITED STATES PATENT OFFICE.

RALPH C. DAUBS AND ROBERT S. CANNON, OF YOUNGSTOWN, OHIO.

DOUGH CHUTE.

Application filed April 29, 1927. Serial No. 187,645.

This invention relates to dough chutes and more especially to a dough chute used in the manufacture of loaves of bread in a modern bakery. This device is an improvement of a small portion of the process necessary in tracing the raw materials through the different steps to the finished product or loaf of bread. Another object of the invention is to provide a chute containing a bottom portion fitted with a plurality of rolls.

Another object of the invention is to provide a metallic plate as a portion of the bottom of the dough chute, this plate to be positioned in reference to the rolls either at the central portion of the chute or at a space left open for this plate near the lower end of said chute. A further object is to provide an open space at the lower end of said metallic plate.

A still further object is to provide one or more of said rolls of a larger diameter than the other rolls forming the bottom of said chute.

One of the difficulties in the manufacture of flour is to carry the loaves from a conveyor belt where the loaves have been inverted when being emptied from a plurality of loaf material containers. In the ordinary manufacture these loaf containers are supplied with flour at the bottom and edges which is unmixed with the raw dough loaf placed therein. Now when this dough loaf is inverted upon the conveyor belt which carries the loaf to the dough chute a considerable amount of flour adheres to the bottom and sides of the loaf. The improved dough chute we have devised receives the loaf and not only carries it rapidly down the chute but removes the undesired flour from the loaves as they pass down the chute.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing wherein:

Figure 1 is a side elevation of the device with parts broken away.

Figure 2 is a top plan view of the device.

In the particular portion of this manufacturing process we utilize a dough chute 1; this dough chute 1 is positioned so as to receive a series of loaves 2 which are carried on a conveyor 3. As the conveyor 3 moves the loaf 2 is inverted and dropped upon a plurality of rolls 4 which carry the same down to a metallic plate 5 over which the loaves 2 pass and the loose flour brushed off falls down in a space 6 between the metallic plate 5 and a larger roll 7. As the roll strikes the larger roll 7 it is given a wave motion freeing it from undesired flour adhering to the raw loaf 2. From here on it continues down the rolls 4 shaking loose any remaining loose flour which falls to a bottom portion 8 of the dough chute 1 and then out at the lower end 9, where the same may be caught in a suitable container. The loaf now leaves the rolls 4 and the dough chute 1 and is delivered to a molding machine which is here represented by molding rolls 10 and 11. This molding machine is of ordinary construction and does not form any direct or important part of our invention.

One of the difficulties which we have eliminated by our improved dough chute 1 is that when one loaf or more slow down or stick in the dough chute 1 they form what is known as a double by one loaf adhering to another. Loaves of this kind are usually taken out of the continued movement of manufacture and either put back in a dough mixer to be worked over again or used for some other purpose.

In either event there is a loss of time in the manufacturing process, and if the double loaves are put back into the mixer the result will be tendency to produce an inferior loaf of bread due to the fact that the dough has over aged by this second treatment.

In a factory where an ordinary plain bottom chute is used there is continually, an undesired amount of flour adhering to the loaves entering the molding machine. As the loaf passes through the molding machine the molded loaf now goes into what is known as a curler which winds the dough into a loaf form. This undesired flour thereby is apt to form and frequently does form what is known to the art of baking as a core in the loaf.

Another feature of our device is to provide a brush 12 which is positioned so as to have constant contact with the conveyor belt 3 thereby keeping the same free from undesired flour which would otherwise adhere and accumulate.

What we claim is:

1. In a device of the class described, a dough chute, a plurality of rollers positioned at the bottom of said chute, a metallic plate in line with said rolls, a larger roll used in conjunction with the other rolls in order to give a loaf passing over the rolls a wave-like motion for the purpose of shaking loose flour that may adhere to the loaves, a space between said metallic plate and said larger roll for the purpose of allowing loose flour to drop down to a bottom portion; spaces between said rolls for the purpose of allowing loose flour to fall through a bottom portion of said chute; substantially as described for the purpose set forth.

2. In a device of a class described a dough chute, a plurality of different size rollers positioned in said dough chute, space between said rolls for the purpose of allowing loose flour to fall through the spaces, a metallic plate in line with said rolls for the purpose of removing loose flour from loaves passing down said dough chute, a bottom portion formed below said rolls and metallic plate forming a slide to carry loose flour down to end of said dough chute, substantially as described.

In testimony whereof we affix our signatures.

RALPH C. DAUBS.
ROBERT S. CANNON.